(12) United States Patent
Fernandez García et al.

(10) Patent No.: US 9,197,468 B2
(45) Date of Patent: Nov. 24, 2015

(54) COMMUNICATION METHODS BETWEEN A TANKER AIRCRAFT AND A RECEIVER AIRCRAFT IN AN IN-FLIGHT REFUELING OPERATION

(71) Applicant: EADS CONSTRUCCIONES AERONAUTICAS, S.A., Getafe (Madrid) (ES)

(72) Inventors: Javier Fernandez García, Getafe (ES); Luis Fernando Gimenez Abad, Getafe (ES)

(73) Assignee: EADS CONSTRUCCIONES AERONAUTICAS, S.A., Madrid (ES)

( * ) Notice: Subject to any disclaimer, the term of this patent is extended or adjusted under 35 U.S.C. 154(b) by 0 days.

(21) Appl. No.: 14/318,849

(22) Filed: Jun. 30, 2014

(65) Prior Publication Data
US 2015/0003556 A1    Jan. 1, 2015

(30) Foreign Application Priority Data
Jun. 28, 2013   (EP) ..................... 13382253

(51) Int. Cl.
*H04L 27/10*   (2006.01)
*H04L 27/14*   (2006.01)
*H04L 27/12*   (2006.01)
*B64D 39/00*   (2006.01)

(52) U.S. Cl.
CPC ................ *H04L 27/14* (2013.01); *B64D 39/00* (2013.01); *H04L 27/12* (2013.01)

(58) Field of Classification Search
None
See application file for complete search history.

(56) References Cited

U.S. PATENT DOCUMENTS

| | | | |
|---|---|---|---|
| 2005/0131933 A1* | 6/2005 | Jha ................................ 707/102 |
| 2009/0045290 A1* | 2/2009 | Small et al. ................ 244/135 A |
| 2012/0183031 A1* | 7/2012 | Kolze et al. .................... 375/224 |

FOREIGN PATENT DOCUMENTS

GB    2 443 671    5/2008

OTHER PUBLICATIONS

European Search Report for 13382253.6 dated Jan. 27, 2014, 5 pages.

* cited by examiner

*Primary Examiner* — Adolf Dsouza
(74) *Attorney, Agent, or Firm* — Nixon & Vanderhye P.C.

(57) ABSTRACT

Transmission of data and audio messages between tanker and receiver aircrafts to facilitate air refueling operations using a boom device, wherein the method includes transmitting a data message from one aircraft to the other aircraft as an analog signal via the electro-magnetic connection which is also used for transmission of audio messages between the aircrafts which may be operating in a radio silence environment.

6 Claims, 6 Drawing Sheets

COMMUNICATION METHODS BETWEEN A TANKER AIRCRAFT AND A RECEIVER AIRCRAFT IN AN IN-FLIGHT REFUELING OPERATION

CROSS-REFERENCE TO RELATED APPLICATIONS

This application claims priority to EP 13382253.6 filed Jun. 28, 2013, the entire content of which is hereby incorporated by reference.

FIELD OF THE INVENTION

The present invention relates to in-flight refueling operations with a boom device and more particularly to communication methods between a tanker aircraft and a receiver aircraft which facilitate the in-flight refueling operation.

BACKGROUND

A usual method of in-flight refueling operations, illustrated in FIG. 1, is based on the use of a boom device 15 to interconnect the tanker aircraft 11 with the receiver aircraft 13. The boom 15 is basically an extensible or telescoping tube attached to the bottom of the tanker aircraft 11 by means of a mechanical articulation which provides the passage of fuel from the tanker aircraft 11 to the receiver aircraft 13.

In the tanker aircraft 11, the operator monitors visually all steps and procedures to carry out a safe refueling operation. In particular, the operator controls the movement of the boom 15 until it is physically connected to the receptacle 19 of the approaching receiver aircraft 13. After completion of the refueling operation in a given session the boom 15 is retracted to its safety position in the tanker aircraft 11.

Refueling operations are very sensitive and must be performed in a very precise and accurate way due to security reasons.

Currently, communications between the tanker aircraft and the receiver aircraft are performed by means of visual signals transmitted from the tanker aircraft and voice communications between the boom operator in the tanker aircraft and the pilot of the receiver aircraft.

For transmitting visual signals to the receiver pilot to facilitate the approaching operation the tanker aircraft includes several Pilot Director Lights (PDL) at its bottom with conventional symbols.

For voice communication radio system are used and, in radio silence environments, an audio transmission system in an intercom mode between the tanker aircraft 11 and the receiver aircraft 13 through an electro-magnetic connection between the tanker aircraft and the receiver aircraft available when both aircraft are coupled is used. In FIG. 2, which represents a known nozzle 16 of a boom device 15, a coil 17 that allows establishing said electro-magnetic connection together with another coil in the receptacle 19 of the receiver aircraft 13 can be seen.

These communication means do not meet all the communication needs between the tanker and the receiver aircraft and the present invention is directed to solving that problem.

SUMMARY OF THE INVENTION

It is an object of the present invention to provide communication methods of data messages between the tanker aircraft and the receiver aircraft to improve the in-flight refueling operations in, particularly, radio silence environments.

This and other objects are met by a method of transmitting data messages through the electro-magnetic connection which is used for contact and disconnection detection and audio communications in radio silence environment between the tanker aircraft and the receiver aircraft comprising the following steps:

a) providing in the aircraft that emits the message a digital data frame containing a data message and a control signal for its sending;

b) converting in the aircraft that emits the message said digital data frame into a digital data signal and transforming this signal into an analog data signal conditioned to a suitable voltage level for its transmission to the target aircraft of the message;

c) transmitting the signal obtained in the previous step to the target aircraft via said electro-magnetic connection;

d) transforming in the target aircraft the received analog data signal into a digital data signal and converting this signal into a digital data frame.

The method comprises the simultaneous transmission of a data message from the tanker aircraft to the receiver aircraft and of a data message from the receiver aircraft to the tanker aircraft.

The method may comprise the transmission of messages that include data messages and voice messages. In such case, the method also comprises in step a), providing in the aircraft that emits the message an analog audio signal containing the voice message and a control signal for its sending;

in step b), converting in the aircraft that emits the message the analog audio signal into a second analog audio signal conditioned to a suitable voltage level for its transmission to the target aircraft and filtered to remove frequencies above a predetermined frequency f1 and mixing the second analog audio signal with the analog data signal for obtaining an analog audio and data signal;

in step d), separating the analog data signal and the analog audio signal contained in the analog audio and data signal received in the target aircraft.

In one embodiment of the method comprising the transmission of data messages and voice messages is contemplated that:

in step b), the transformation of the digital data signal into an analog data signal is performed by means of a Frequency-Shift Keying modulation process obtaining a modulated signal in two frequencies f2, f3 for the logic levels 0 and 1, being f2 lesser than f3 and being f2 greater than f1;

in step d) the separation of the analog data signal and the audio data signal is made filtering in parallel the analog audio and data signal to eliminate, respectively, the frequencies below f2 and the frequencies above f1.

Other desirable features and advantages of the invention will become apparent from the subsequent detailed description of the invention and the appended claims, in relation with the enclosed drawings.

DETAILED DESCRIPTION OF THE INVENTION

Figure 1:
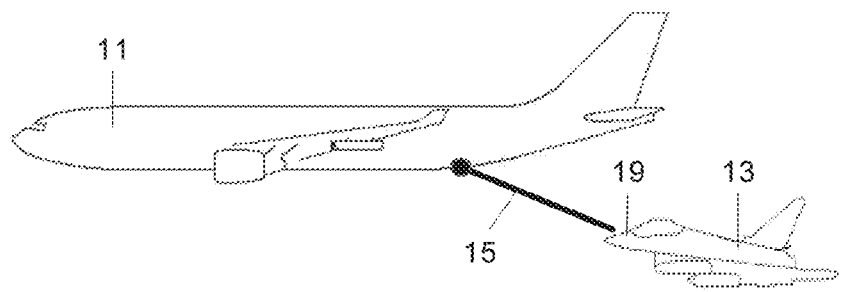
FIG. 1 is a schematic view of an in-flight refueling operation between a tanker aircraft and a receiver aircraft using a boom device.
Figure 2:
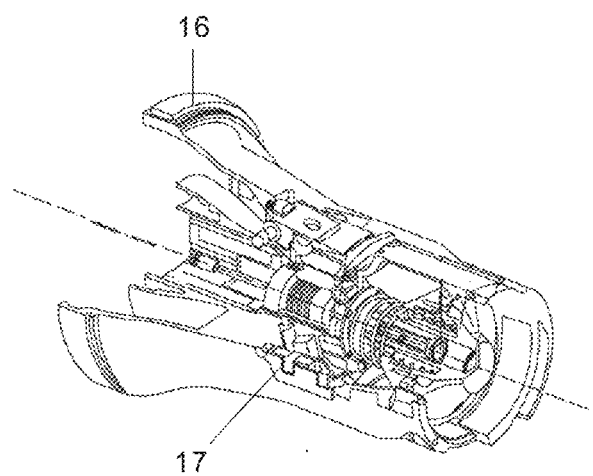
FIG. 2 is a perspective view of a known nozzle of a boom device.

The method of the present invention comprises any kind of transmission of messages via the electro-magnetic connection between the coils 17, 18 of, respectively, the nozzle 16 of the boom device 15 of the tanker aircraft 11 and the receptacle 19 of the receiver aircraft 13, comprising the simultaneous transmission of a voice message and a data message or the transmission of a data message from the tanker aircraft 11 to the receiver aircraft 13 and/or from the receiver aircraft 13 to the tanker aircraft 11.

A detailed description of the method of the invention for different transmissions of messages between the tanker aircraft 11 and the receiver aircraft 13 follows.

Figure 3:
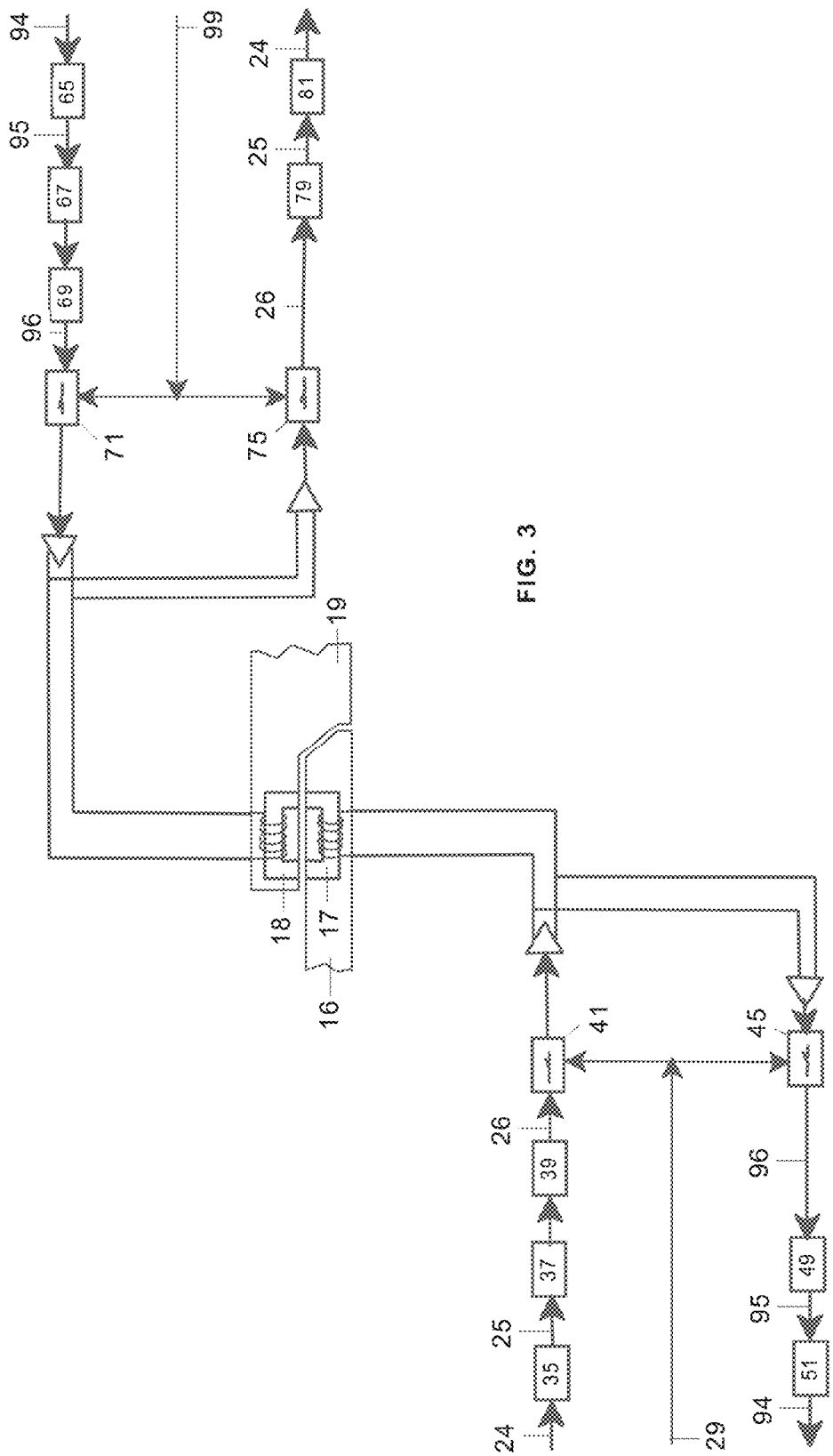
FIG. 3 is a block diagram illustrating the communication method of the invention for transmitting data messages between the tanker aircraft and the receiver aircraft.

Transmission of Data Messages Between the Tanker Aircraft and Receiver Aircraft (See FIG. 3)

A digital data frame 24 generated by a device of the tanker aircraft 11 (indicating, for example, the remaining time to complete the ongoing refueling operation) is converted into a digital data signal 25 at step 35. That signal is conditioned to a suitable voltage level for its transmission to the receiver aircraft 13 in step 37 and is subjected to a modulation process in step 39 to obtain an analog data signal 26.

Preferably, the modulation process of step 39 is a Frequency-Shift Keying (FSK) modulation process that generates two fixed frequencies f2, f3 corresponding respectively to the logic levels 0 and 1.

Other modulation processes, particularly the Amplitude-Shift Keying (ASK) or the Phase-Shift Keying (PSK) modulation processes can also be used in step 39.

The transmission of the analog data signal 26 to the next step is controlled by a switch 41 according to the content of the Request to Send (RTS) signal 29 of the data message.

The analog data signal 26 is injected into the coil 17 of the nozzle 16 of the boom device 15 and transmitted to the receiver aircraft 13 through the electro-magnetic connection with the coil 18 of the receptacle 19 of the receiver aircraft 13.

In the receiver aircraft 13 the switch 75 controls the reception of the analog data signal 26. In step 79 said signal is de-modulated to obtain the digital data signal 25 and in step 81 is converted in the digital data frame 24 to be sent to its destination.

Similarly a digital data frame 94 generated by a device of the receiver aircraft 13 (indicating, for example, the pressure of the received fuel) is converted in step 65 into a digital data signal 95, is conditioned to an appropriate voltage level for its transmission to the tanker aircraft 11 in step 67 and is subjected to a modulation process in step 69 to obtain an analog data signal 96.

The transmission of the analog data signal 96 to the next step is controlled by a switch 71 according to the content of the RTS control signal 99 of the data message.

The analog data signal 96 is injected into the coil 18 of the receptacle 19 of the receiver aircraft 13 and transmitted to the tanker aircraft 11 through the electro-magnetic connection with the coil 17 of the nozzle 16 of the boom device 15.

In the tanker aircraft 11 the switch 45 controls the reception of the analog data signal 96. In step 49 said signal is de-modulated to obtain the digital data signal and in step 51 is converted in the digital data frame 94 for being sent to its destination.

Figure 4:
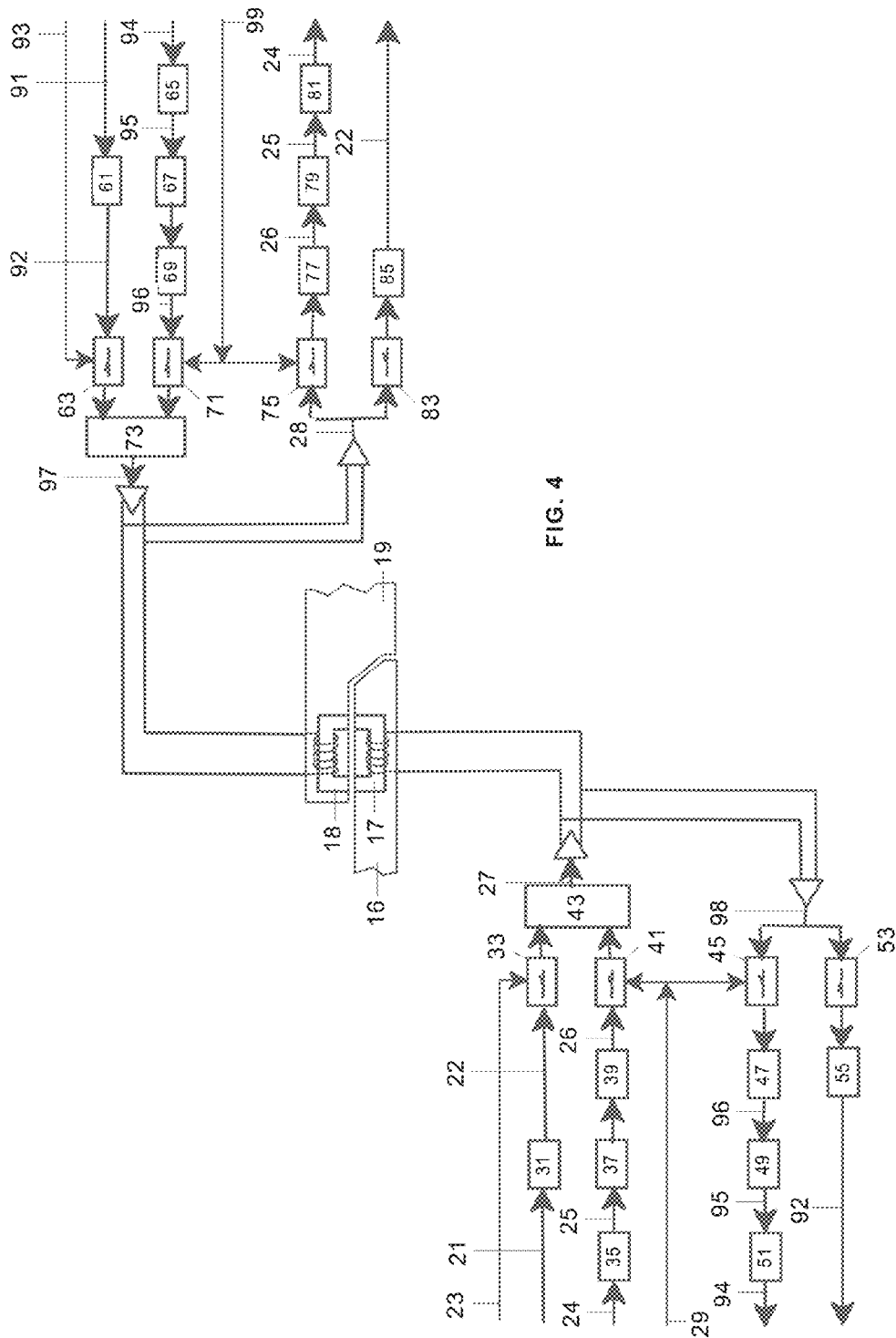
FIG. 4 is a block diagram illustrating the communication method of the invention for the simultaneous transmission of data messages and voice messages between the tanker aircraft and receiver aircraft.

Simultaneous Transmission of Data Messages and Voice Messages Between the Tanker Aircraft and the Receiver Aircraft (See FIG. 4)

An analog audio signal 21, generated by the equipment of the boom device operator or of another crewman of the tanker aircraft 11 when a voice message directed the pilot of the receiver aircraft 13 is issued (informing him, for example, about the start of the refueling operation), is conditioned to a suitable voltage level for its transmission to the receiver aircraft 13 and filtered to remove frequencies above a predetermined frequency f1 to eliminate treble tones (preferably f1=5 KHz) in step 31 obtaining a second analog audio signal 22. The transmission of the analog audio signal 21 to the next step is controlled by a switch 33 according to the activation/deactivation of the Push to Talk (PTT) signal 23 of the voice message.

A digital data frame 24 generated by a device of the tanker aircraft 11 (indicating, for example, the remaining time to complete the ongoing refueling operation) is converted into a digital data signal 25 at step 35. That signal is conditioned to a suitable voltage level for its transmission to the receiver aircraft 13 in step 37 and is subjected to a modulation process in step 39 to obtain an analog data signal 26.

In case of using a Frequency-Shift Keying modulation, the two frequencies f2 and f3 of the analog data signal 26 should be greater than the above-mentioned frequency f1. Suitable values for these frequencies f2 and f3 are, for example, 15 KHz and 20 KHz respectively, which are greater than the frequency of the voice message to allow simultaneous transmission of a voice message and a data message.

The transmission of the analog data signal 26 to the next step is controlled by a switch 41 according to the content of the Request to Send (RTS) signal 29 of the data message.

In step 43 the second analog audio signal 22 and the analog data signal 26 are mixed for its simultaneous transmission and the mixed signal is amplified. The resultant signal 27 that thus contains a voice message and a data message is injected into the coil 17 of the nozzle 16 of the boom device 15 and transmitted to the receiver aircraft 13, through the electro-magnetic connection with the coil 18 of the receptacle 19 of the receiver aircraft 13, resulting the signal 28.

In the receiver aircraft 13 switches 75 and 83 allow receiving the signal 28.

In step 77 the signal 28 is filtered to pass only the analog data signal 26 that is de-modulated in step 79 to obtain the digital data signal 25 that is converted in step 81 in the digital data frame 24 to be sent to its destination.

The signal 28 is also filtered in step 85 to pass only the analog audio signal 22 to be sent to its destination.

Likewise an analog audio signal 91, generated by the equipment of the pilot of the receiver aircraft when emits a voice message directed to the operator of the tanker aircraft 11 (informing him, for example, about the fuel volume needed) is conditioned to a suitable voltage level for its transmission to the tanker aircraft 11 and filtered to remove frequencies above a predetermined frequency f1 to eliminate treble tones in step 61 obtaining a second analog audio signal 92. The transmission of the second analog audio signal 92 to the next step is controlled by a switch 63 according to the activation/deactivation of the PTT signal 93 of the voice message.

A digital data frame 94 generated by a device of the receiver aircraft 13 (indicating, for example, the pressure of the received fuel) is converted into a digital data signal 95 at step 65. That signal is conditioned to a suitable voltage level for its transmission to the tanker aircraft 11 in step 67 and is subjected to a modulation process in step 69 to obtain an analog data signal 96.

The transmission of the analog data signal 96 to the next step is controlled by a switch 71 according to the content of the Request to Send (RTS) signal 99 of the data message.

In step 73 the second analog audio signal 92 and the analog data signal 96 are mixed for simultaneous transmission and the mixed signal is amplified. The resultant signal 97 that thus contains a voice message and a data message is injected into the coil 18 of the receptacle 19 of the receiver aircraft 13 and transmitted to the receiver aircraft 13 through the electro-magnetic connection with the coil 17 of the nozzle 16 of the boom device 15 resulting the signal 98.

In the tanker aircraft 11 switches 45 and 53 allow receiving the signal 98.

In step 47 the signal 98 is filtered to pass only the analog data signal 96 that is de-modulated in step 49 to obtain the digital data signal 95 that is converted in step 51 in the digital data frame 94 to be sent to its destination.

The signal 98 is also filtered in step 55 to pass only the analog audio signal 92 to be sent to its destination.

Figure 5:
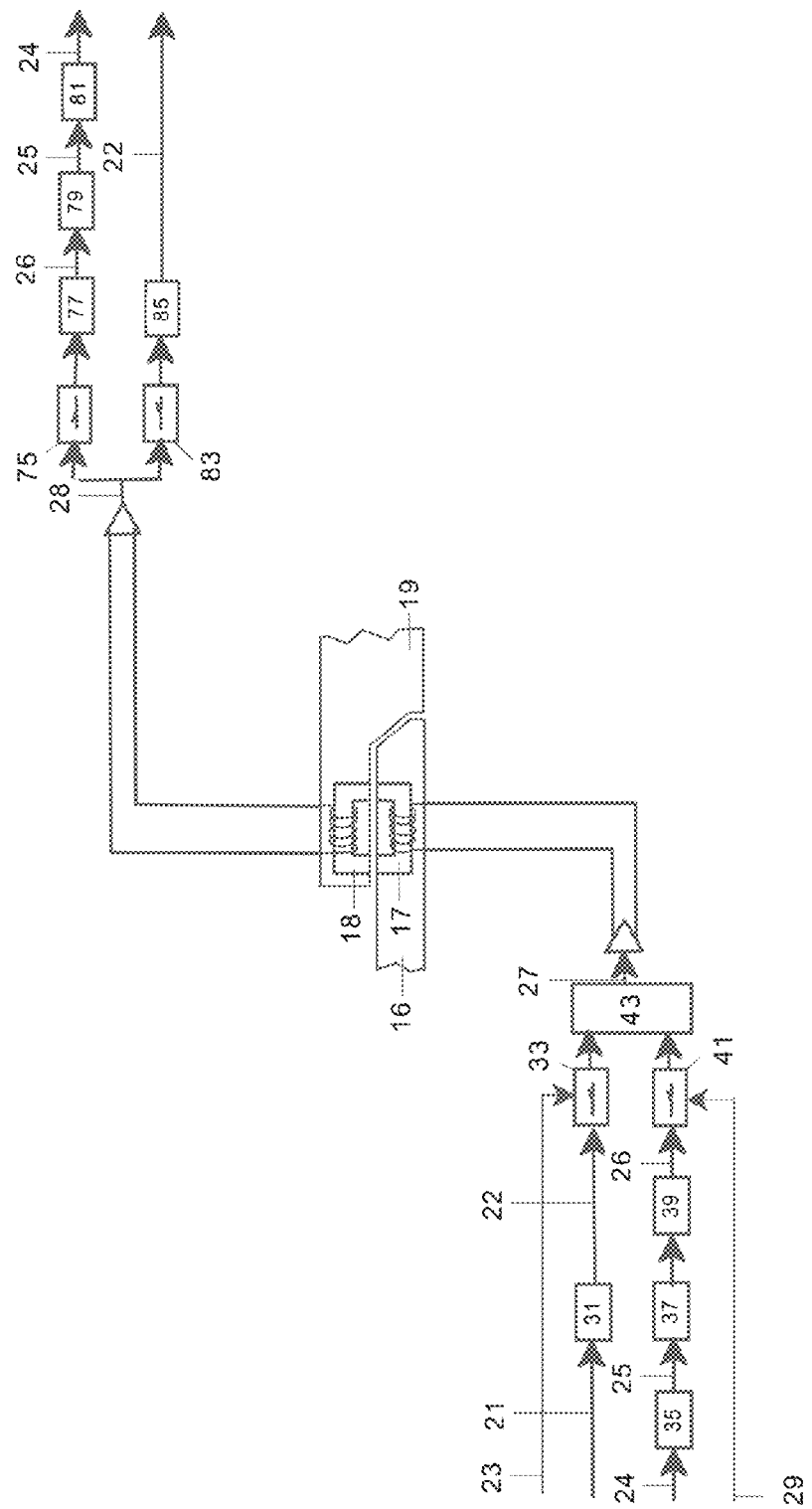
FIG. 5 is a block diagram illustrating the communication method of the invention for the transmission of data messages and voice messages from the tanker aircraft to the receiver aircraft.

Simultaneous Transmission of Data Messages and Voice Messages from the Tanker Aircraft to the Receiver Aircraft (See FIG. 5)

This is a particular case of the above in which communication occurs in one direction only.

Figure 6:
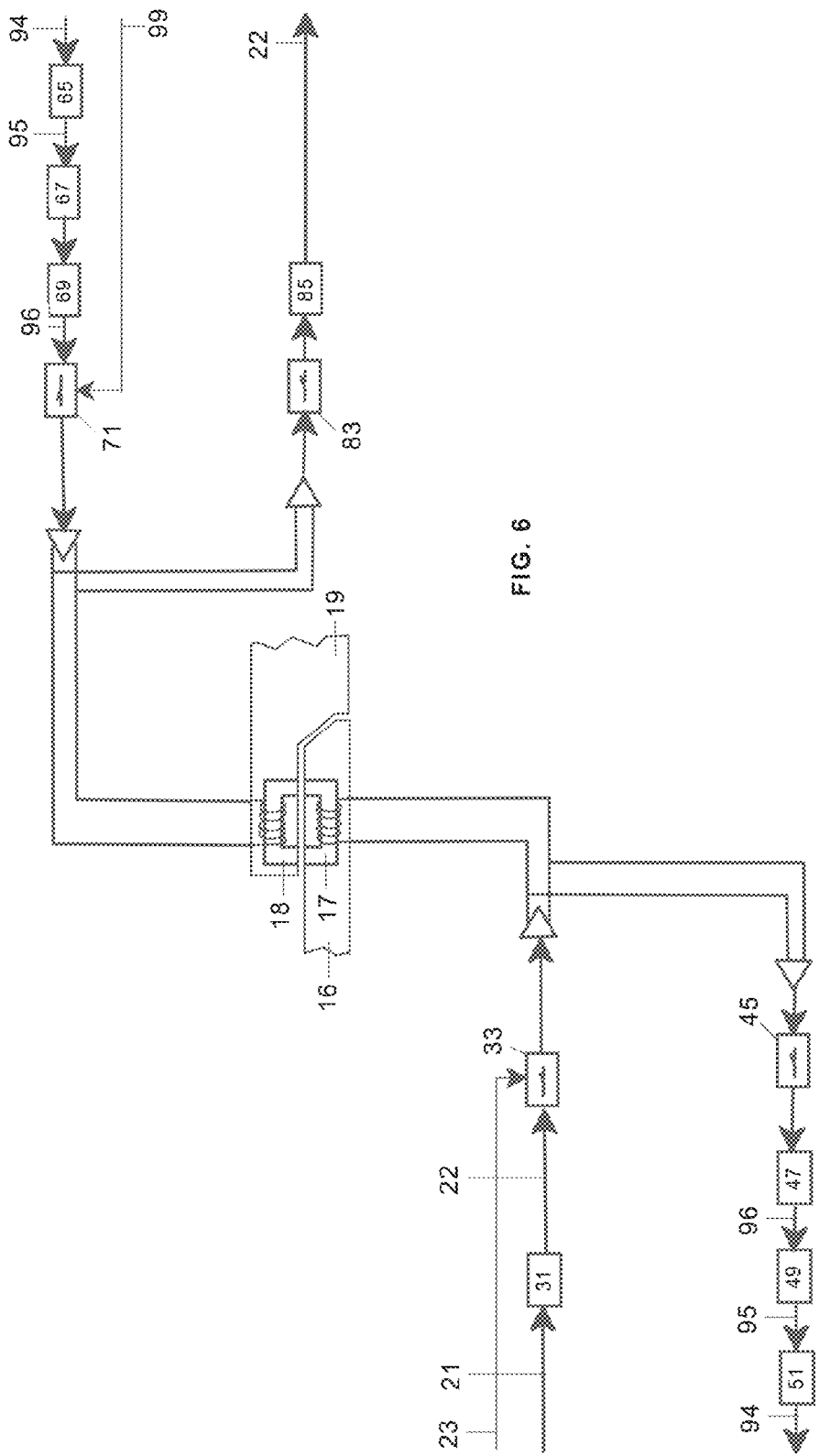
FIG. 6 is a block diagram illustrating the communication method of the invention for the transmission of voice messages from the tanker aircraft to the receiver aircraft for the transmission of data messages from the receiver aircraft to the tanker aircraft.

Transmission of Voice Messages from the Tanker Aircraft to the Receiver Aircraft and of Data Messages from the Receiver Aircraft to the Tanker Aircraft (See FIG. 6)

It is a particular case of that illustrated in FIG. 4 in which communication occurs in two directions for different types of messages.

Figure 7:
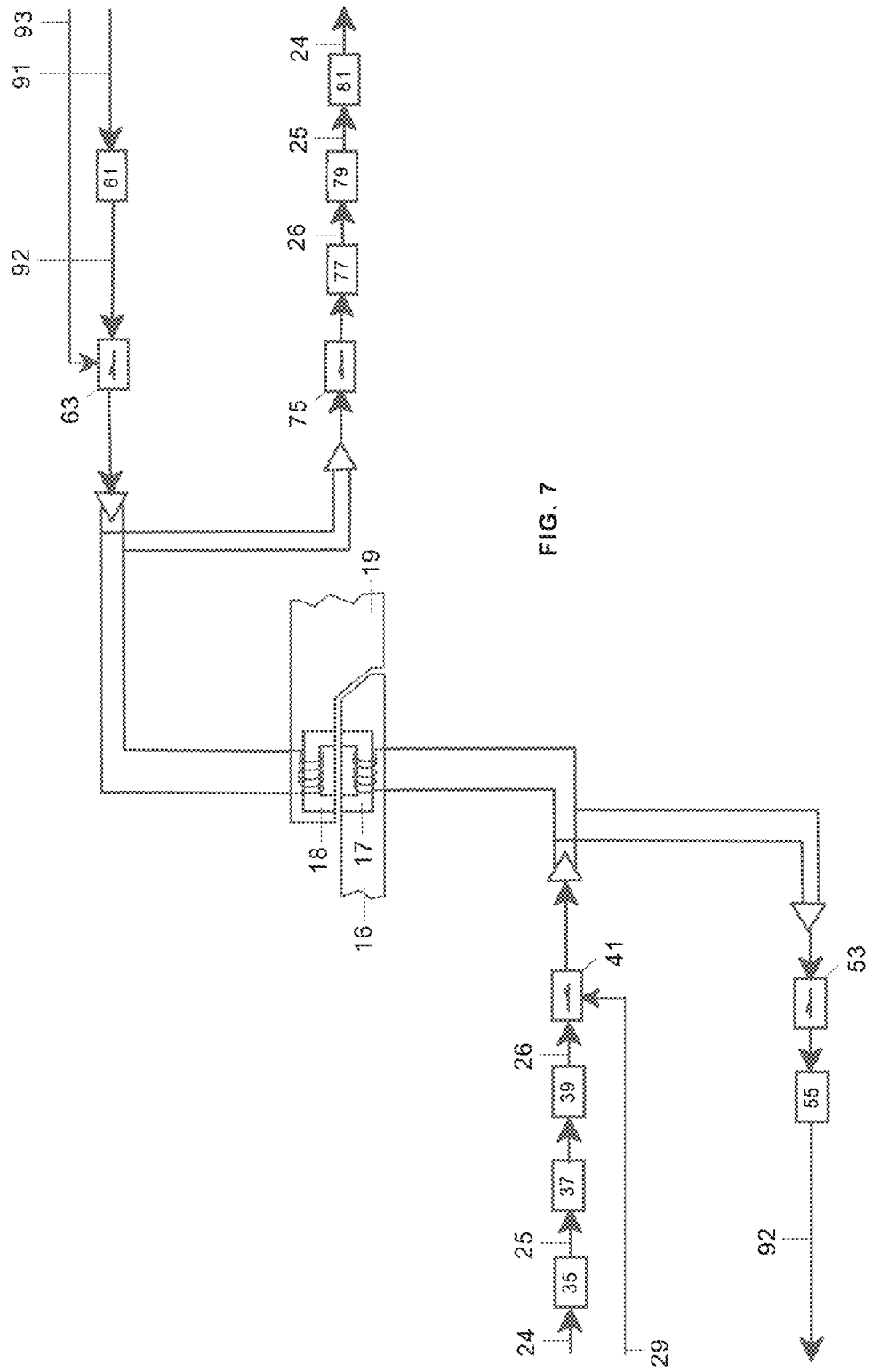
FIG. 7 is a block diagram illustrating the communication method of the invention for the transmission of voice messages from the receiver aircraft to the tanker aircraft and for the transmission of data messages from the tanker aircraft to the receiver aircraft.

Transmission of Voice Messages from the Receiver Aircraft to the Tanker Aircraft and of Data Messages from the Tanker Aircraft to the Receiver Aircraft (See FIG. 7)

As in the above is a particular case of that illustrated in FIG. 4 in which communication occurs in two directions for different types of messages.

An advantage of the method of the present invention is that it enables the establishment of a digital communication channel between a tanker aircraft 11 and a receiver aircraft 13 through the electro-magnetic connection between the coil 17 of the nozzle 16 of the boom device 15 and the coil 18 of the receptacle 19 of the receiver aircraft 13.

Another advantage of the method of the present invention is its utility for refueling systems of unmanned receiver aircraft requiring the exchange of data messages with the tanker aircraft.

Another advantage of the method of the present invention is that it enables the establishment of a redundant system for detecting contact between the tanker aircraft and the receiver aircraft.

Although the present invention has been described in connection with various embodiments, it will be appreciated from the specification that various combinations of elements, variations or improvements therein may be made, and are within the scope of the invention.

The invention claimed is:

1. A method of transmitting a message between a tanker aircraft and a receiver aircraft during an in-flight refueling operation performed by a boom device deployable from the tanker aircraft and connectable to a receptacle of the receiver aircraft, the boom device and the receptacle comprising coils which establishes an electro-magnetic connection between the tanker aircraft and the receiver aircraft while connected during a refueling operation, wherein the message comprises a data message and a voice message, and the method comprises:

providing in the aircraft that emits the message, a digital data frame containing the data message and a control signal, and an analog audio signal containing the voice message and a control signal;

converting, in the aircraft that emits the message, the digital data frame into a digital data signal and transforming the digital data signal to an analog data signal conditioned to a suitable voltage level for transmission to the target aircraft of the message;

converting the analog audio signal to a second analog audio signal conditioned to a suitable voltage level for transmission to the target aircraft and filtered to remove frequencies above a predetermined frequency f1;

mixing the second analog audio signal with the analog data signal to form an analog audio and data signal;

transmitting the analog audio and data signal to the target aircraft via said electro-magnetic connection;

separating the analog data signal and the second analog audio signal contained in the analog audio and data signal received in the target aircraft, and transforming, in the target aircraft, the analog data signal to the digital data signal and thereafter converting the digital data signal converted to the digital data frame.

2. The method according to claim 1, wherein:

the transformation of the digital data signal into an analog data signal is made by Frequency-Shift Keying modulation process to obtain a signal modulated in two frequencies f2, f3 for the logic levels 0 and 1, being f2 lesser than f3 and being f2 greater than f1; and the separation of the analog audio and data signal includes filtering in parallel the analog audio and data signal to remove frequencies lesser than the frequency f2 and the frequencies greater than the frequency f1.

3. The method according to claim 1, wherein the tanker aircraft transmits analog audio and data signals while the receiver aircraft transmits analog audio and data signals.

4. A method to transmit a message between a tanker aircraft and a receiver aircraft which form a pair of aircraft in flight, the method comprising:

connecting the pair of aircraft in flight by a conductive coil mounted to a boom extending from the tanker aircraft to the receiver aircraft;

converting a data message to form a first digital data signal;

converting the first digital data signal to a first analog data signal condition to a voltage level suitable for transmission via the conductive coil;

converting a voice message to a first analog audio signal conditioned to a voltage level suitable for transmission via the conductive coil and filtered to remove frequencies above a predetermined frequency f1;

mixing the first analog audio signal and the first analog data signal to form an analog audio and data signal;

transmitting the analog audio and data signal from a transmitting aircraft of the pair of aircraft via the conductive coil;

receiving the transmitted analog audio and data signal by a target aircraft of the pair of aircraft via the conductive coil;

separating a second analog audio signal and a second analog data signal from the received analog data signal and the analog audio signal, and converting the second analog data signal to a second digital data signal and recovering the data message from the second digital data signal.

5. The method of claim 4 wherein the first digital data signal and the second digital data signal represent substantially the same digital information.

6. The method of claim 4 wherein the first analog audio signal and the second analog signal carry the same voice message.

\* \* \* \* \*